United States Patent Office 2,794,835
Patented June 4, 1957

2,794,835
ALKYL ALANINANILIDES

Nils Magnus Löfgren, Lidingo, and Bengt J. Lundqvist, Stockholm, Sweden; Josef A. Lundqvist and Gota E. Lundqvist, heirs of said Bengt J. Lundqvist, deceased, assignors to Aktiebolaget Astra Apotekarnes Kemiska Fabriker, Sodertalje, Sweden, a company of Sweden No Drawing. Application July 14, 1952,
Serial No. 298,836

2 Claims. (Cl. 260—562)

This invention relates to alkyl alaninanilides having three methyl group substituents on the benzene nucleus, and which are specially useful as anaesthetics, more especially local anaesthetics. Compounds of a related group are described in our Patent No. 2,441,498 and were found to possess very, and in some cases exceedingly, favourable properties for anaesthetic purposes, such as comparatively low toxicity in comparison with their efficiency, very quick-acting, useful without addition of vaso-constrictors, and forming salts which are very stable in aqueous solutions and with adrenaline.

Through further extensive investigations we have found that compounds of the general formula:

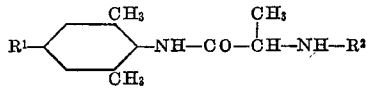

in which $R^1$ represents $CH_3$ and $R^2$ is a saturated aliphatic hydrocarbon group containing two or three carbon atoms only and having at most two carbon atoms linked to one another in sequence with one another and the nitrogen to which the group $R^2$ is linked; also possess favourable properties of the kind referred to above.

The invention is illustrated more in detail with reference to the following examples, it being, however, understood that it is not limited to the single complete example.

Without the intention of restricting the invention, in general, the present compounds are preferably prepared by reacting an α-halogeno-propionylanilide with ethyl amine or isopropyl amine. The preparation may be illustrated by the following detailed example.

Preparing of α-ethylamino-propionyl-2,4,6-trimethylanilide 1 mole α-brompropionyl-2,4,6-trimethylanilide is suspended in 1200 ml. dry benzene and is poured into an iron autoclave which is cooled to 0° C. 5 moles of monoethylamine are added and after closing the autoclave, the mixture is heated to 80° C. for 6 hours and is shaken repeatedly. After cooling, the benzene solution is diluted with an equal volume of ether and the precipitate of ethylamine hydrobromide formed is filtered off. The filtrate is extracted 5 times with 2 N hydrochloric acid. The base is then liberated from the extracts by adding concentrated ammonia and is taken up in ether. After drying the ether solution, the solvent is driven off and the desired compound crystallizes in colourless needles. Melting point 98 to 100° C. Yield 89%.

What is claimed is:
1. As a local anesthetic α-ethylamino-propionyl-2,4,6-trimethylanilide.
2. An alpha-alkylamino-propionyl-2,4,6-trimethylanilide of the general formula

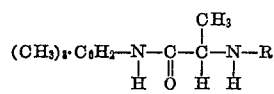

wherein R is an alkyl group having from two to three carbon atoms and with at most two carbon atoms linked to one another in sequence with one another and the nitrogen to which the alkyl group R is linked, as a local anesthetic.

References Cited in the file of this patent
UNITED STATES PATENTS 2,411,662 Martin et al. _____ Nov. 26, 1946
2,441,498 Lofgren et al. _____ May 11, 1948

FOREIGN PATENTS 634,073 Great Britain _____ Mar. 15, 1950
509,516 Belgium _____ Mar. 15, 1952

OTHER REFERENCES

Lofgren et al.: "Svensk. Kem. Tidskr," vol. 58 (1946), pp. 323–335.